April 25, 1950     C. P. KRUPP     2,505,677
TRANSPORTING AND DEPOSITING CONVEYER
Filed May 22, 1948     2 Sheets-Sheet 1
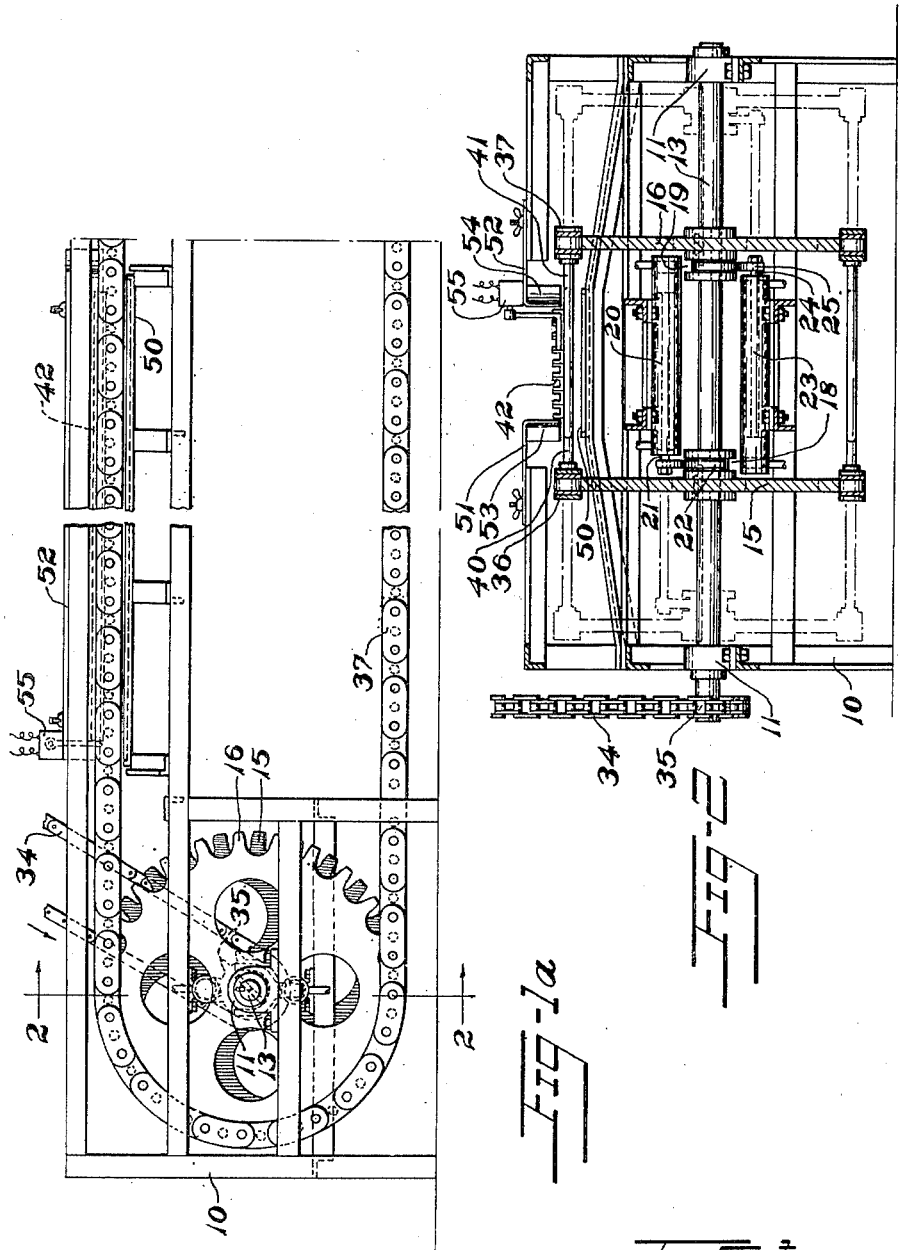
Inventor
Carroll P. Krupp April 25, 1950     C. P. KRUPP     2,505,677
TRANSPORTING AND DEPOSITING CONVEYER
Filed May 22, 1948     2 Sheets-Sheet 2
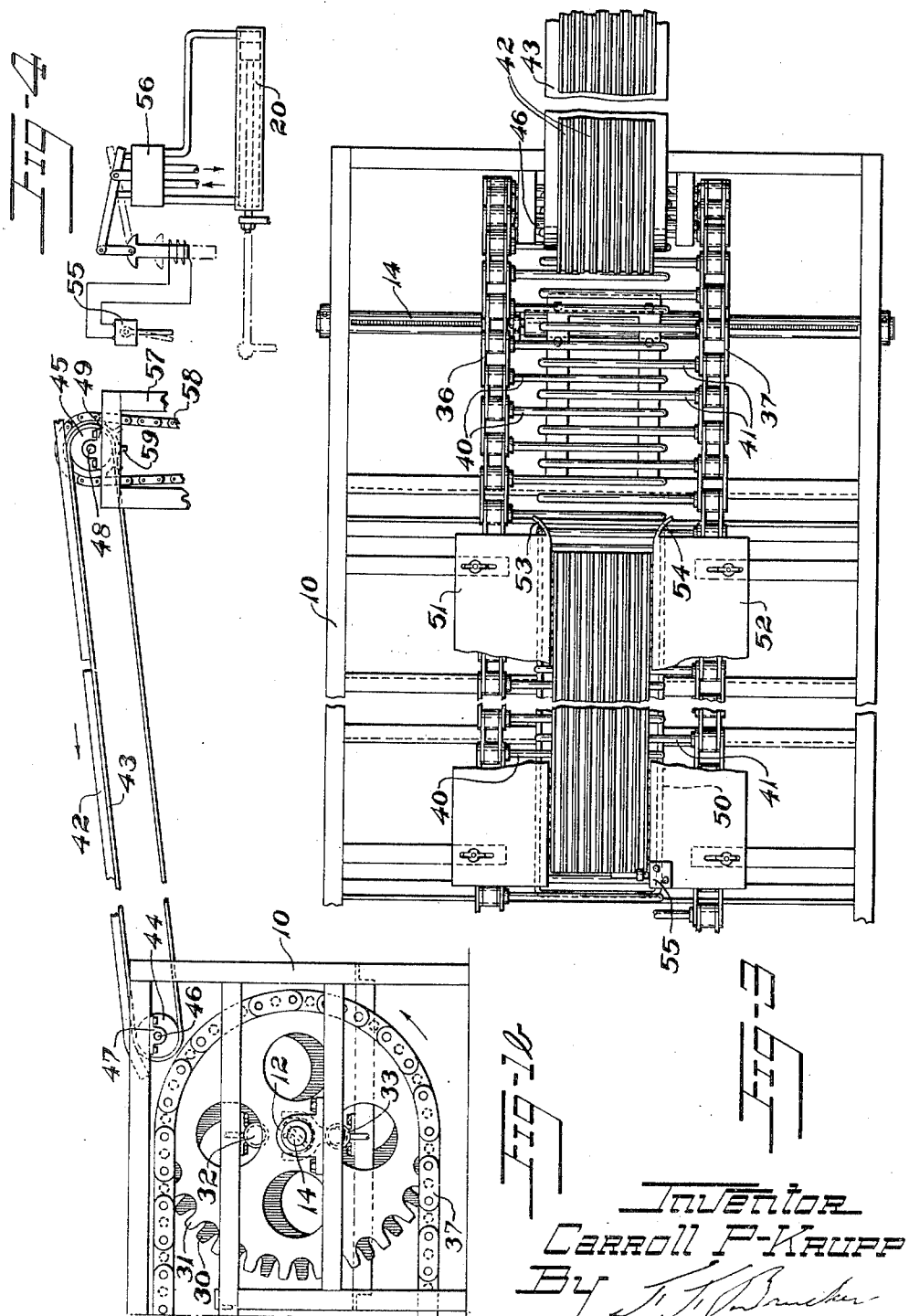
Inventor
Carroll P. Krupp Patented Apr. 25, 1950

2,505,677

UNITED STATES PATENT OFFICE 2,505,677

TRANSPORTING AND DEPOSITING CONVEYER

Carroll P. Krupp, Barberton, Ohio, assignor to The B. F. Goodrich Company, New York, N. Y., a corporation of New York Application May 22, 1948, Serial No. 28,678

6 Claims. (Cl. 198—185)

This invention relates to conveyor apparatus for handling articles and is especially useful in the handling of vulcanizable rubber-like articles in strip form although the invention is also useful in handling other articles of other materials, especially those in long strip form.

In the manufacture of strip articles of rubber composition or other rubber-like material the strips have been formed of the unvulcanized plastic material by extrusion or calendering and then laid upon pans or trays for supporting them during a curing operation. This has required manual handling of the strips.

Objects of the present invention are to provide for transporting and depositing of the strip material without manual handling and to provide improved apparatus for the purpose.

Other objects are to provide for deposit of a plurality of strips simultaneously, and to provide for guiding of the strips to proper position on the pans.

These and other objects will appear from the following description and the accompanying drawings.

Of the drawings,

Figs. 1a and 1b show in continuation of each other a side elevation of apparatus constructed in accordance with and embodying the invention, parts being broken away.

Fig. 2 is a section taken on line 2—2 of Fig. 1.

Fig. 3 is a plan view thereof, parts being broken away.

Fig. 4 is a wiring and piping diagram.

Referring to the drawings, the numeral 10 designates a supporting frame having bearings 11, 12 in which a pair of shafts 13, 14 are rotatably mounted in parallel relation to each other.

A pair of sprockets 15, 16 of equal diameter, are mounted on shaft 13 for rotation therewith and for sliding movement axially thereof, each sprocket having a key for slideably engaging a long keyway in the shaft. The hubs of the sprockets are formed with shifter grooves 18, 19. A double-acting pressure fluid operated cylinder 20 is mounted on the frame 10 and its piston rod 21 has a shifter fork 22 engaging in groove 18 of the sprocket 15. A similar cylinder 23 mounted on frame 10 has a piston rod 24 with a shifter fork 25 engaging in groove 19 of sprocket 16. The arrangement is such that the sprockets 15, 16 may be moved by the cylinders from the full line positions of Fig. 2 to the dot-and-dash line positions thereof.

Shaft 14 is similarly provided with sprockets 30, 31 slideably mounted thereon and double-acting cylinders 32, 33 are provided for shifting the sprockets in similar manner.

Shaft 13 is driven from any convenient source of power (not shown) by a chain 34 engaging a sprocket 35 fixed to the shaft. Sprockets 15 and 30 are connected by an endless flexible conveyor member such as a chain 36 and sprockets 16 and 31 are connected by an endless flexible conveyor member, such as a chain 37 parallel and opposed thereto. Chains 36 and 37 have lateral extensions such as rods 40, 41 extending therefrom, the rods or extensions extending toward the opposite chain and being arranged in spaced-apart noncontacting intercalated relation so as collectively to provide a support for the strip material or other articles, which support thus bridges the space between the chains completely and makes it possible to support a plurality of individual articles, such as flexible strips, simultaneously.

The strips 42 of material are delivered to the rods 40, 41 by a conveyor belt 43 trained about pulleys 44, 45. Pulley 44 is fixed to a shaft 46 journaled in bearings 47 on frame 10 above chains 36, 37 so as to deliver the strip therefrom. Pulley 45 is secured to a shaft 48 which is journaled in bearings 49 on a frame 57. A chain 58 drives shaft 48 from a convenient source of power (not shown) through a sprocket 59 on the shaft.

For directing the strips 42 to a position over the pan 50 guide fences 51, 52 are adjustably mounted on the frame 10 in position to overhang the conveyor chains 36, 37, and have rounded ends 53, 54 for deflecting the strips. Such fences also act as stripper means for holding the articles as the rods are withdrawn.

For operating the cylinders 20, 23, 32, 33, a limit switch 55 is located on the fence 52 in the path of the strips and is closed by contact with the leading ends of the strips. A solenoid four-way valve 56 operates when energized by closing of the switch to control flow of pressure fluid to the cylinders 20, 23, 32, 33 to separate the chains 36, 37 and drop the strips in the pan 50 supported by the frame 10, and when the solenoid is de-energized, reverses flow to the cylinders returning the chains to the full line positions.

The operation of the apparatus is as follows: Strips 42 are fed by the belt conveyor 43 onto the rods 40, 41 which are travelling at the same or slightly increased speed. The fences 51, 52 guide the strips to a position over the pan 50. When the leading ends of the strips contact the limit switch, the chains 36, 37 move laterally withdrawing the rods 40, 41 from beneath the strips which drop onto the pan. The pan with the strips 42 thereon is removed and replaced by an empty pan during the advance of the next group of strips.

The strips may be rapidly loaded onto pans in the desired order without manual handling.

Variations may be made without departing from the scope of the invention as it is defined by the following claims.

I claim:

1. Conveyor apparatus for transporting and depositing articles, said apparatus comprising a pair of conveyor members having lateral extensions disposable in intercalated relation one to another providing as a group an article-support completely bridging the space between said conveyor members, means for driving said members to advance said support, and means for moving said members laterally of the direction of advance to separate said extensions for dropping articles supported thereby.

2. Conveyor apparatus for transporting and depositing articles, said apparatus comprising a pair of conveyor members having lateral extensions disposable in intercalated relation one to another providing as a group an article support completely bridging the space between said conveyor members, means for driving said members to advance said support, and means for moving said members laterally of the direction of advance to separate said extensions throughout their extent for dropping articles supported thereby.

3. Conveyor apparatus for transporting and depositing articles, said apparatus comprising a pair of conveyor members having lateral extensions disposable in intercalated relation one to another providing as a group an article support completely bridging the space between said conveyor members, means for driving said members to advance said support, means for guiding articles to a position over said extensions, and means for moving said members laterally of the direction of advance to separate said extensions for dropping articles supported thereby.

4. Conveyor apparatus for transporting and depositing articles, said apparatus comprising a pair of conveyor members having lateral extensions disposable in intercalated relation one to another providing as a group an article support completely bridging the space between said conveyor members, means for driving said members to advance said support, means for guiding articles to a position over said extensions, and means operating in response to arrival of the articles at a position for laterally separating said members throughout their extent to deposit articles supported thereby.

5. Conveyor apparatus for transporting and depositing articles, said apparatus comprising a pair of opposed endless conveyor members having lateral extensions disposable in intercalated relation one to another providing as a group an article support completely bridging the space between said conveyor members, guiding and stripping means extending over said extensions for aligning articles thereon and limiting lateral movement thereof, means for driving said members to advance said support, and means in the path of said articles operating in response to arrival of the articles at a position for laterally separating said members throughout their extent to deposit articles supported by said extensions.

6. Conveyor apparatus for supporting and depositing articles, said apparatus comprising a pair of endless conveyor chains having lateral rod-like extensions disposable in intercalated relation one to another providing as a group an article support, sprockets for supporting and driving said conveyor chains to advance said support, means for moving said sprockets laterally of the direction of advance of said support for separating said extensions to deposit articles supported thereby, and means in the path of said articles operating in response to arrival of the articles at a position for initiating movement of said sprocket moving means.

CARROLL P. KRUPP.

REFERENCES CITED

The following references are of record in the file of this patent:

UNITED STATES PATENTS

| Number | Name | Date |
|---|---|---|
| 2,257,469 | Keil | Sept. 30, 1941 |
| 2,273,689 | Borow et al. | Feb. 17, 1942 |